United States Patent
Albracht

(10) Patent No.: US 12,325,623 B1
(45) Date of Patent: Jun. 10, 2025

(54) SHOW STICK WITH SPRING JOINT

(71) Applicant: Nick Albracht, Bushland, TX (US)

(72) Inventor: Nick Albracht, Bushland, TX (US)

( * ) Notice: Subject to any disclaimer, the term of this patent is extended or adjusted under 35 U.S.C. 154(b) by 0 days.

(21) Appl. No.: 18/433,556

(22) Filed: Feb. 6, 2024

Related U.S. Application Data

(60) Provisional application No. 63/622,652, filed on Jan. 19, 2024.

(51) Int. Cl.
*B68B 11/00* (2006.01)
*A01K 15/00* (2006.01)

(52) U.S. Cl.
CPC ............ *B68B 11/00* (2013.01); *A01K 15/003* (2013.01)

(58) Field of Classification Search
CPC ....................................................... B68B 11/00
See application file for complete search history.

(56) References Cited

U.S. PATENT DOCUMENTS

| | | | | |
|---|---|---|---|---|
| 492,606 A | * | 2/1893 | Bush ...................... | B68B 11/00 231/2.1 |
| 555,776 A | * | 3/1896 | Kelly et al. ............. | B68B 11/00 231/3 |
| 769,516 A | * | 9/1904 | Van Deusen ........... | B68B 11/00 231/2.1 |
| 770,897 A | * | 9/1904 | Felker ..................... | B68B 11/00 231/2.1 |
| 777,336 A | * | 12/1904 | Felker ..................... | B68B 11/00 231/5 |
| 787,972 A | * | 4/1905 | Boeselt ................... | B68B 11/00 242/400 |
| 829,392 A | * | 8/1906 | Felker ..................... | B68B 11/00 231/2.1 |
| 842,089 A | * | 1/1907 | Felker ..................... | B68B 11/00 231/2.1 |
| 1,099,013 A | * | 6/1914 | Breeden .................. | B68B 11/00 231/2.1 |
| 1,160,490 A | * | 11/1915 | Bourikas ................. | B68B 11/00 43/18.5 |
| 3,136,480 A | * | 6/1964 | O'Neill ................... | B68B 11/00 231/2.1 |
| 3,799,429 A | * | 3/1974 | Henry ..................... | B68B 11/00 231/2.1 |

FOREIGN PATENT DOCUMENTS

GB          190605498 A   *   8/1906

* cited by examiner

*Primary Examiner* — Jessica B Wong
(74) *Attorney, Agent, or Firm* — Braxton Perrone, PLLC; Bobby W. Braxton; Gregory Perrone

(57) ABSTRACT

A system and method for a show stick. The show stick has an upstream whip component joined with a downstream whip component by a joint. There is a spring overlaying the joint. At least one protective layer is placed atop the spring. The protective layer keeps the fine edges from making contact with an animal. The spring provides the necessary flexibility, but the spring further reinforces the joint and ensures the whip does not come apart at the joint.

17 Claims, 7 Drawing Sheets

# SHOW STICK WITH SPRING JOINT

BACKGROUND OF THE INVENTION

Priority

The present invention claims priority to U.S. Provisional Application No. 63/622,652 filed Jan. 19, 2024, the entirety of which is hereby incorporated by reference.

Technical Field

The present invention relates to a system and method for a show stick.

Description of Related Art

Show sticks are used for showing animals, such as pigs, horses, etc. However, the show sticks are easily broken. Consequently, there is a need for an improved show stick.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1:
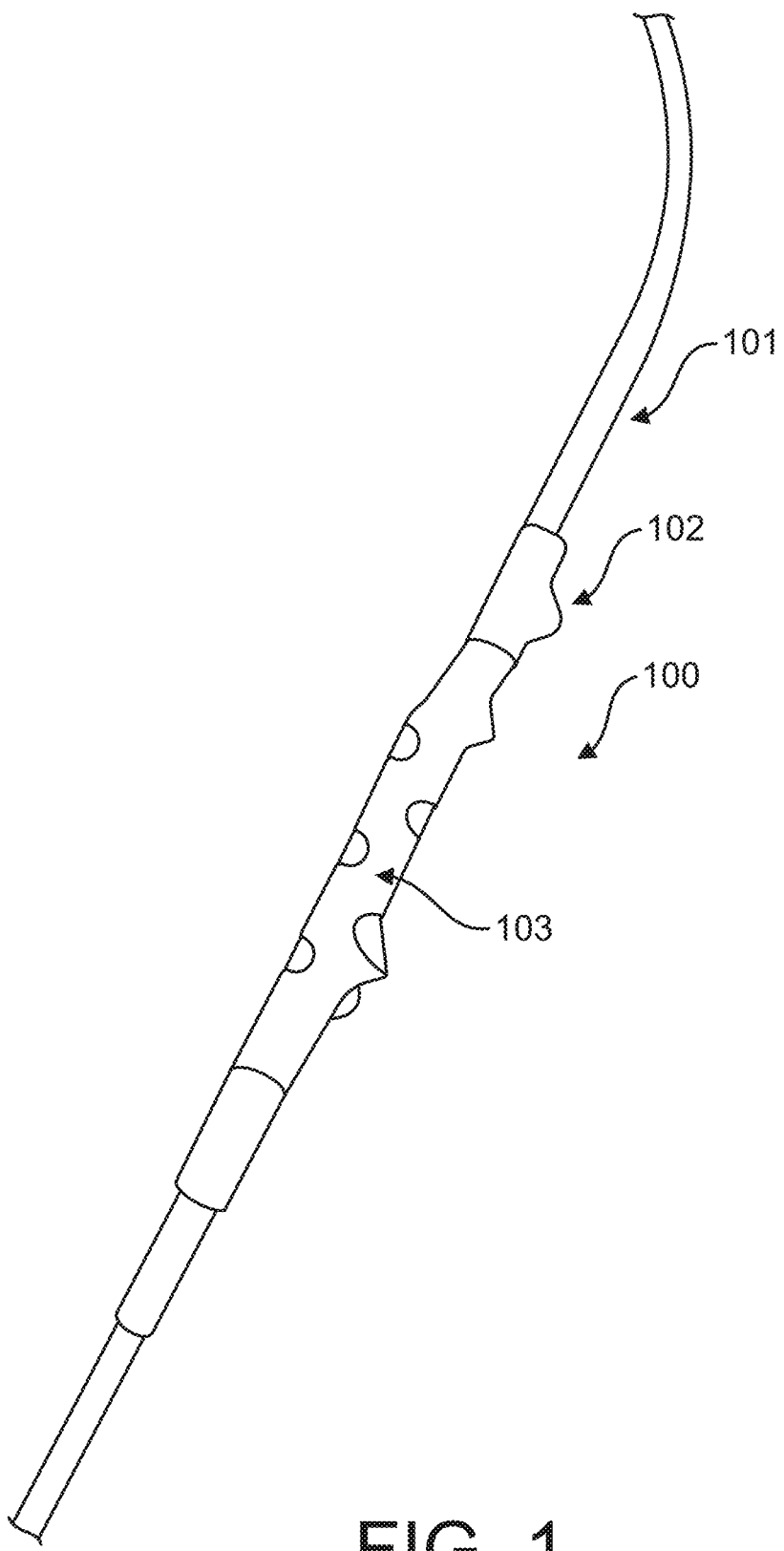
FIG. 1 is a perspective view of the show stick in one embodiment.

FIG. 1 is a perspective view of the show stick in one embodiment. A show stick, as used herein, refers to a tool which is used to show an animal, such as a pig, horse, goat, or other show animals. The show stick is used to make contact with the animal to get them to move, stand, or show in a desired position.

As shown the show stick 100 comprises a traditional whip 101. The whip can comprise virtually any material including leather, plastic, rubber, and combinations thereof. In one embodiment the whip 101 comprises nylon wrapped around fiber glass. In one embodiment, a whip 101 comprises of two or more pieces joined together at a joint (104 in FIG. 2). The joint 104 is where two pieces of the whip 101 are joined. Unless properly secured and supported as discussed herein, a whip can easily come apart at the joint. This is undesirable as it renders the whip inoperable. The whip can have various sizes and lengths. In one embodiment the whip has a 36 inch fiberglass shaft, whereas in other embodiments it has a 32 inch fiberglass shaft. In some embodiments the whip comprises a handle for better handling.

Accordingly, in one embodiment discussed herein, a system and method is disclosed whereby the joint is supported such that the whip does not come apart during use. As shown the show stick 100 comprises a spring 105 (not depicted in FIG. 1) which underlies a first protective layer 102. In some embodiments, a second protective layer 103 overlies the first protective layer 102. The result is a structurally sound show stick which still has the flexibility of a traditional whip, but which will not break apart at the joint.

Figure 2:
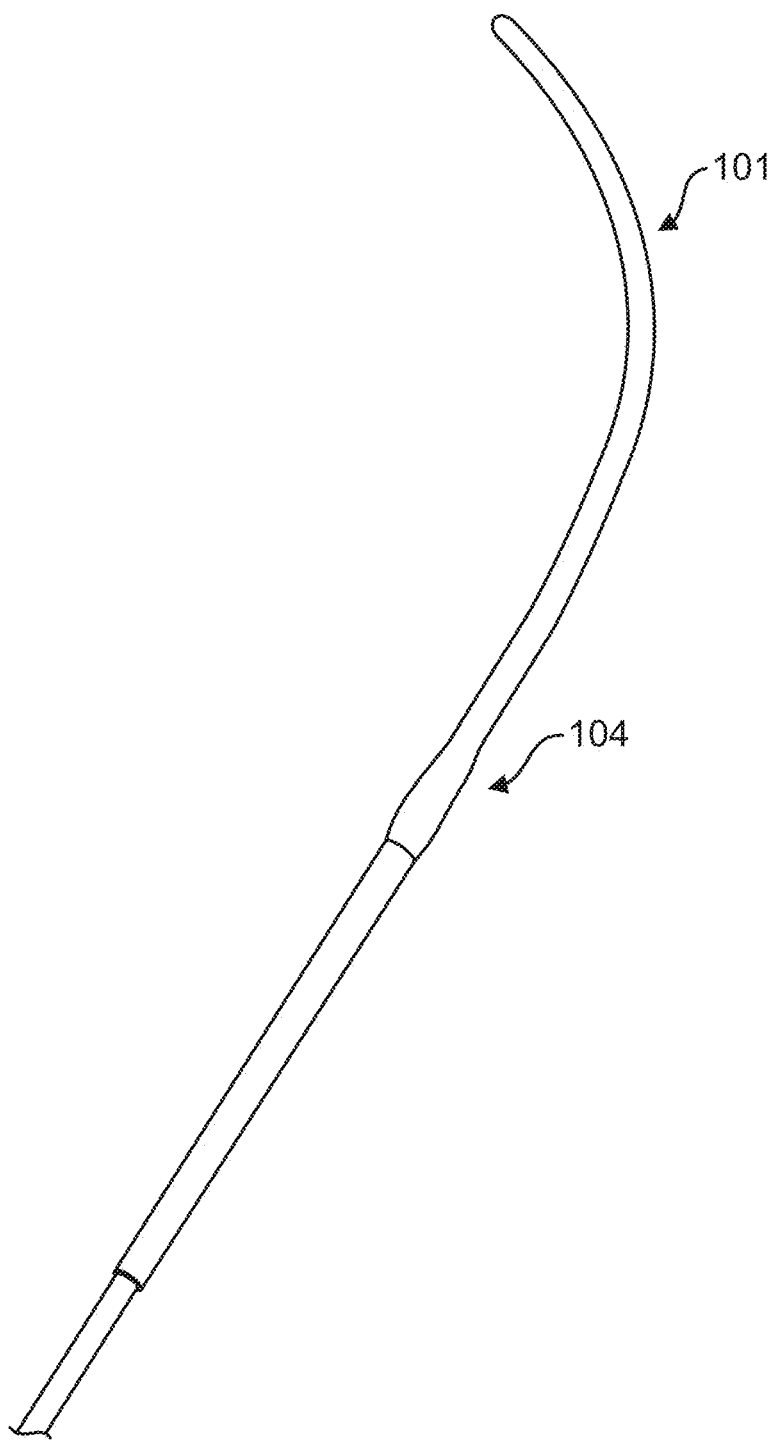
FIG. 2 is a perspective view of the whip in one embodiment.

Turning now to FIG. 2, FIG. 2 is a perspective view of the whip in one embodiment. FIG. 2 shows the two pieces of the whip joined together at the joint 104. The joint 104 can take many configurations. As shown the joint 104 has a larger diameter compared to the adjacent upstream 110 and downstream 109 portions of the whip. Downstream and upstream refer to relative locations on the shooting stick or whip. Downstream is the end of the shooting stick furthest away from the user whereas upstream refers to the end closer to the user's hand. In one embodiment the whip comprises of two separate components: an upstream whip component and a downstream whip component. Both components are joined together at the joint 104. In some embodiments, if sufficient force is applied, the downstream whip portion 109 can be separated from the upstream whip portion 110.

In one embodiment the downstream whip 109 has an open upstream opening into which the downstream end of the upstream whip fits. They can fit together via friction or adhesive. However, as noted, the joint 104, alone, is insufficient to keep the two whip components joined together during use.

Figure 3:
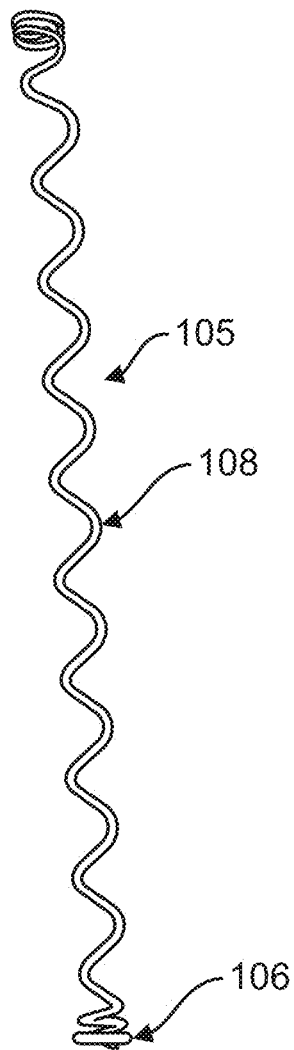
FIG. 3 is a perspective view of the spring in one embodiment.

Turning to FIG. 3, FIG. 3 is a perspective view of the spring 105 in one embodiment. The spring 105 can comprise virtually any type of spring 105. In one embodiment the spring 105 comprises metal but this is for illustrative purposes only and should not be deemed limiting. In one embodiment the coiled spring is about one inch, and stretches to about 2.5-3 inches before being wound around the whip. In one embodiment tight coils are made around the whip.

The spring 105 has a plurality of coils 108 along its length. The spring 105 can have various lengths. In one embodiment the spring 105 is long enough to extend both upstream and downstream from the joint 104. The length can range from 2 inches to about 5 inches, depending upon the desired size of the show stick. Various types of springs can be utilized so long as they can be wrapped around the whip. The whip portions can be inserted through the coils 108, or the each coil 108 can be wrapped around the whip portions.

Figure 4:
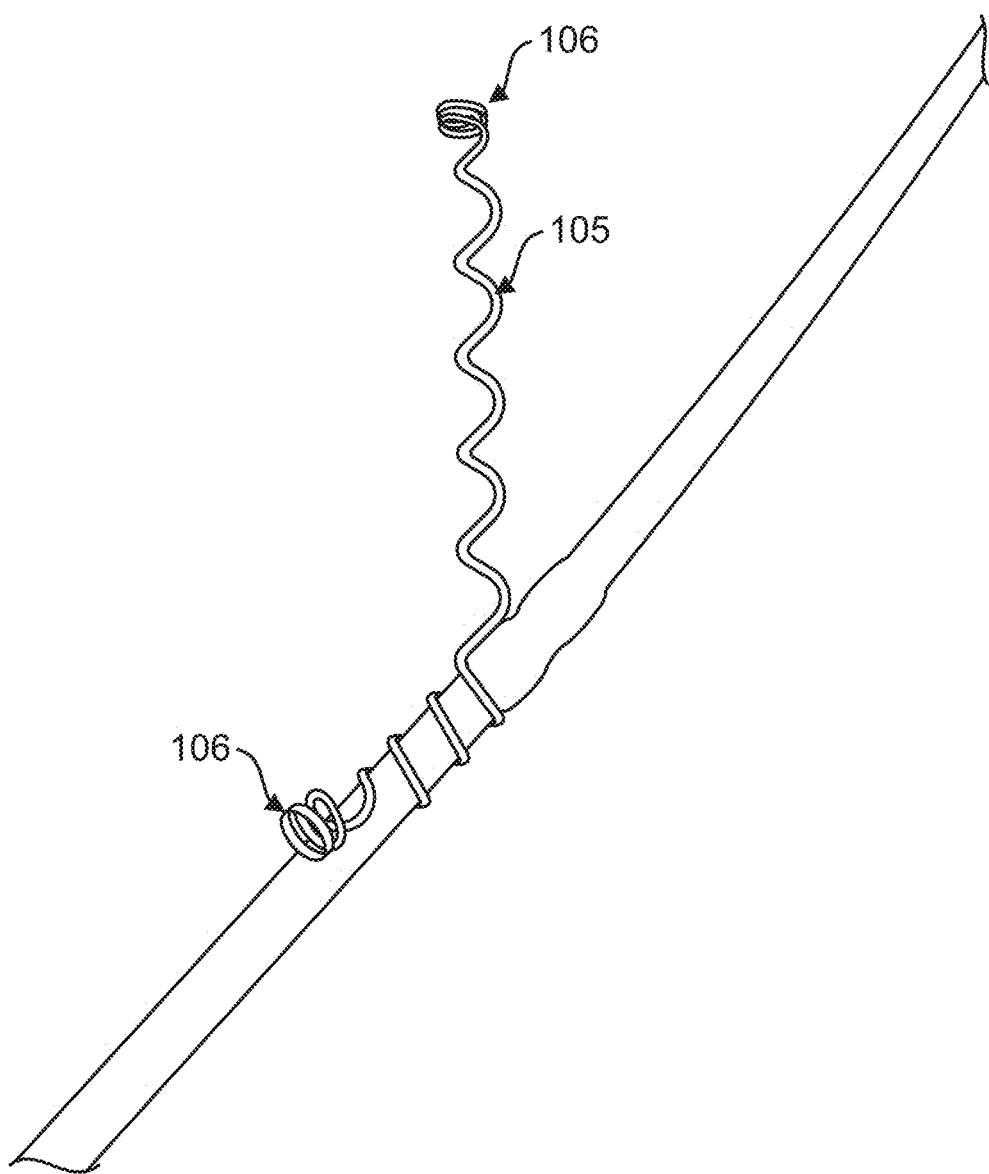
FIG. 4 is a perspective view of spring being installed on the whip in one embodiment.

FIG. 4 is a perspective view of spring 105 being installed on the whip in one embodiment. As can be seen, the coils wrap about the whip. A portion of the spring 105 wraps upstream of the joint, a portion wraps downstream of the joint 104, and it the spring 105 also covers the joint.

There are multiple purposes of the spring 105. First, the spring 105 reinforces the joint 104. The spring 105 ensures the joint 104 remains intact and prevents the upstream component of the whip from disconnecting from the downstream component of the whip. Second, the spring 105 maintains the necessary flexibility for the show stick. The show stick needs to be flexible to be effective and function as a whip. If the spring 105 only secured the joint 104, but failed to allow flexibility, the show stick would not be able to flex and bend at the joint 104. Thus, the spring 105 reinforces the joint 104 while allowing maximum flexibility.

As seen, the ends of the spring comprise a spring coil end 106. This is at least one full coil, if not more, that makes up the end of the spring 105. As shown, in one embodiment, this portion is left alone and placed adjacent to the whip 101 as opposed to be uncoiled and wrapped around the whip 101. This provides an additional contact point for the whip to make contact with the animal. This is beneficial in using with animals. In one embodiment both spring coil ends 106 are left in a partially coiled position adjacent to, as opposed to wrapped around, the whip 101.

Figure 5:
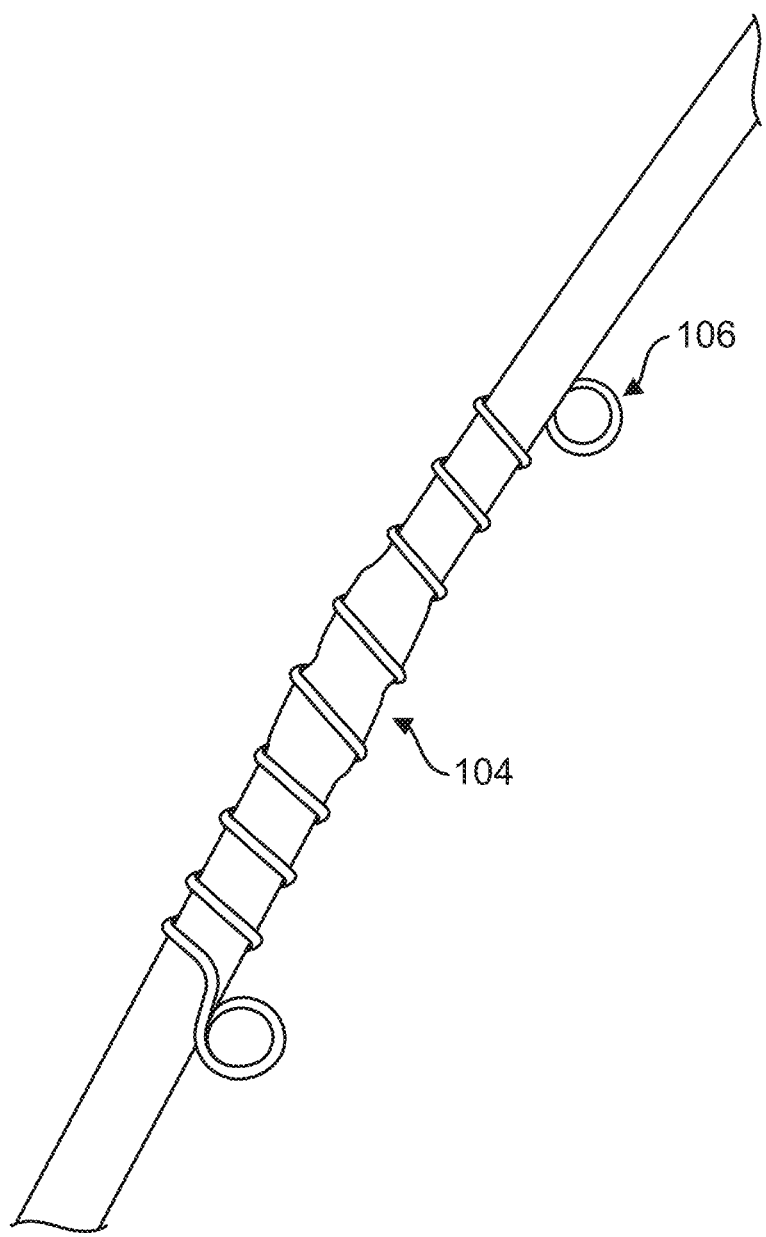
FIG. 5 is a perspective view of the spring installed on the whip in one embodiment.

FIG. 5 is a perspective view of the spring installed on the whip in one embodiment. As can be seen, the ends 106 are left coiled. They extend outwardly away from the whip to provide a point of contact. The remaining portion of the spring 105 is wrapped tightly around the whip to provide the necessary structural support.

Figure 6:
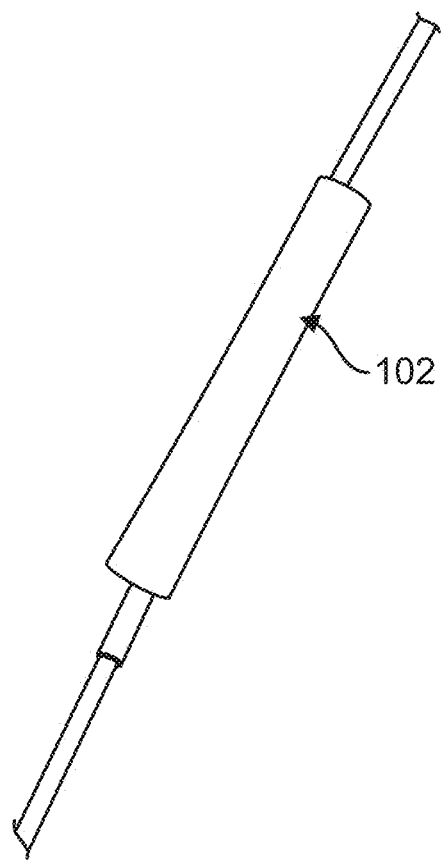
FIG. 6 is a perspective view of the first protective coating installed over the spring in one embodiment.

In one embodiment, direct contact of the spring 105 with the animal is to be avoided. The show stick is designed to encourage and direct the animal, but direct contact with metallic edges, such as a spring, is to be avoided. Thus, in one embodiment a first protective layer 102 is overlaid around the spring 105. FIG. 6 is a perspective view of the first protective coating installed over the spring in one embodiment.

The length of the first protective layer 102, as measured in the same direction as the length of the whip-moving from upstream to downstream—is at least as great as the total length of the spring 105. Thus, in one embodiment, the total length of the spring 105 is covered by the first protective layer 102. In one embodiment the protective layer 102 comprises a cylindrical hollow tube. The dimensions of the tube can vary depending upon the size of the whip. In one embodiment the protective layer 102 has a diameter of about 3/8 of an inch. This allows it to slide over the spring. In some embodiments the protective layer 102 comprises electrical heat shrink which, upon application of heat, shrinks the diameter of the protective layer 102 to snugly fit around the spring 105. The length of the protective layer 102, in some embodiment, does not change with application of heat. In one embodiment the diameter experiences a 3:1 shrink after heating.

The first protective layer 102 can comprise any material which covers the spring 105 and provides a protective layer over the spring 105. As noted, in one embodiment the first protective layer 102 comprises electrical heat shrink. Electrical heat shrink is a material which shrinks under heat. Thus, the material which can be installed loosely will tighten and shrink after application of heat. In one embodiment the first protective layer 102 ensures there are no sharp edges and it serves to further reinforce the joint 104.

The first protective layer 102 can be wrapped around the spring 105. If needed or desired, the first protective layer 102 can be shrunk or tightened around the spring 105. In other embodiments, the a first protective layer 102 is not needed. Instead, the spring 105 already has a protective layer or sheath.

Figure 7:
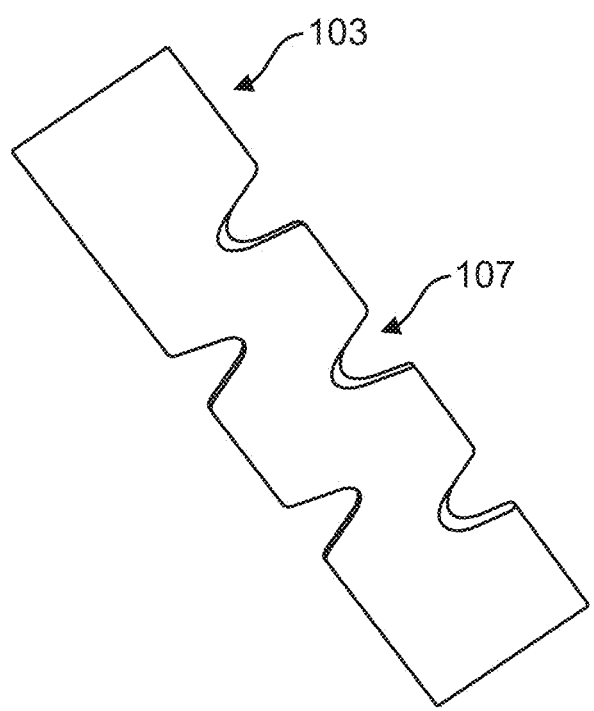
FIG. 7 is a perspective view of the second protective coating in one embodiment.

In some embodiments, to further reinforce the joint 104, there is a second protective layer 103. FIG. 7 is a perspective view of the second protective coating in one embodiment.

The second protective layer 103 is laid atop and around the first protective layer. As shown the second protective layer 103 comprises a similar tube like the first protective layer 102. As shown, the second protective layer comprises a plurality of notches 107 along its length. The notches 107, as depicted, are on both sides of the protective layer 103. The notches 107 provide increased flexibility at the location of the notch 107. The notches 107 can be cut into the second protective layer 103, or the notches 107 can be integrally made within the second protective layer.

While the notches are shown as being a V-shape, this is for illustrative purposes only and should not be deemed limiting. Virtually any shape notch 107 can be utilized including circular or other shapes. The second protective layer provides a further opportunity to reinforce and strengthen the whip at the joint 104 while maintaining the desired flexibility.

The second protective layer 103 can comprise the same or dissimilar material as the first protective layer 103. If the second protective layer 103 comprises electrical heat shrink the material can be shrunk to provide for a tighter fit.

Figure 8:
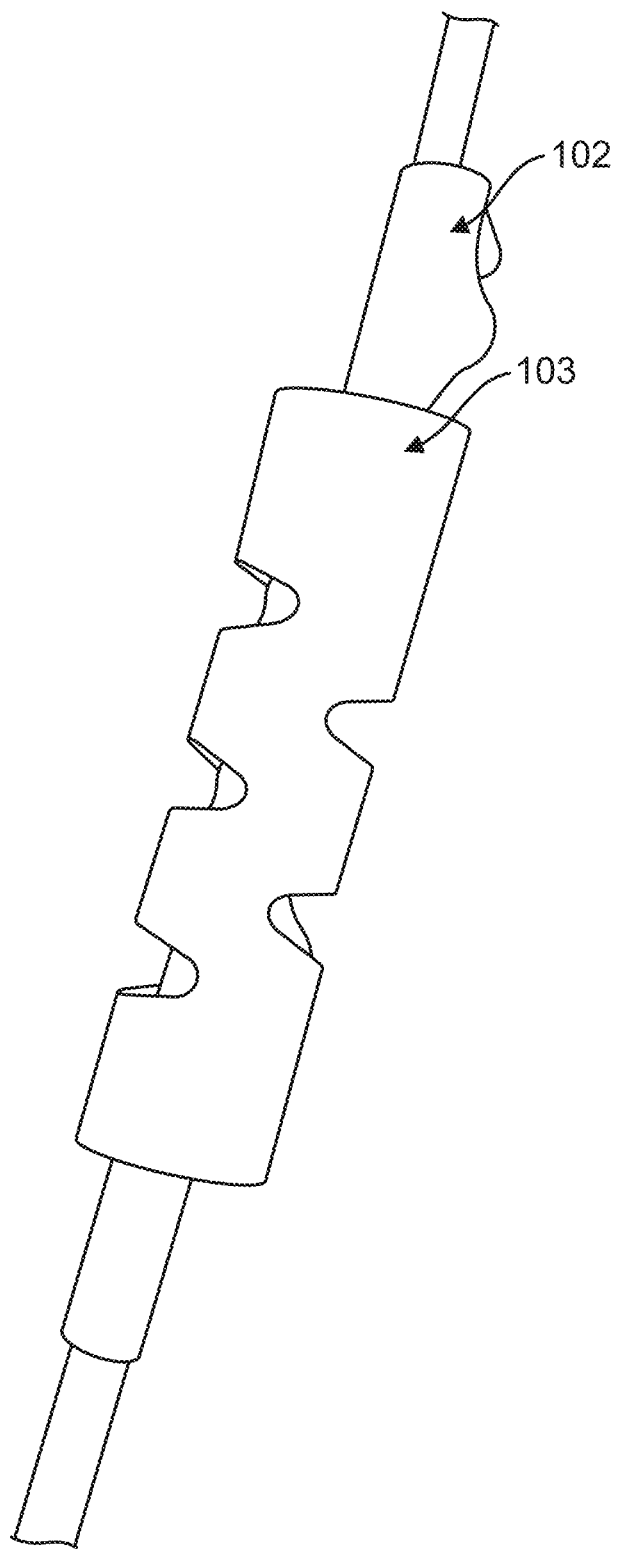
FIG. 8 is a perspective view of the second protective coating installed over the first protective coating in one embodiment.

Turning to FIG. 8, FIG. 8 is a perspective view of the second protective layer installed over the first protective layer in one embodiment. As shown the second protective layer 103 has not been tightened around the first protective layer 102. In this particular embodiment there is the spring, the first protective layer, and the second protective layer which all surround and support the joint 104. As noted, the layers and spring work to simultaneously support the joint 104 while maintaining maximum flexibility.

Now that a system has been described, a method of making the show stick will be described. Note, this description of the method is for illustrative purposes only and should not be deemed limiting.

The method begins by obtaining a whip which has an upstream whip portion coupled to a downstream whip portion at a joint. The whip portions can comprise various materials as noted above. The whip portions can already be joined at the joint, or the whip portions can be coupled together at the joint.

To reinforce and support the stick at the joint, a spring is installed around the joint 104. The spring is sufficiently long to cover the joint and extend at least a portion upstream and downstream from the joint.

Next, in some embodiments, a first protective layer is placed around the spring. The first protective layer extends upstream and downstream beyond the spring.

In some embodiments a second protective layer is placed around the first protective layer. In one embodiment, the spring comprises a plurality of coils. Therefore, the installing step includes wrapping the coils around portions of said upstream whip portion and said downstream whip portion.

As noted above, in some embodiments, the installation step includes leaving at least one spring coil end not wound around either said upstream whip portion or said downstream whip portion. This provides a feature which can make contact with the animal. However, because this feature is under at least one protective layer, no sharp edges contact the animal.

As noted, in some embodiments, the placing of the first or second protective coating layer can include shrinking the protective layer to fit snugly around said spring. Additionally, as noted, the second protective layer can include notches along its length to increase flexibility. Depending upon the material used in the protective layer, notches may or may not be needed or utilized.

As shown in FIG. 1, in some embodiments the first protective has a greater length than the spring length and the second protective layer. This ensures the entirety of the spring is covered by at least one protective layer.

As noted, the system and method discussed herein have several advantages. First, without the additional support structure, the whip comes apart. Thus, the first benefit is increased life of the product. A user does not want a show stick to become broken during a show. Thus, the added support ensures the show stick does not come apart or become broken, requiring a replacement show stick.

Second, the show stick retains the necessary and desired flexibility. Without the flexibility the show stick does not function as intended. The spring, the notches, the material of the protective layer, etc. all contribute to maintaining the desired flexibility.

A third benefit is the spring coil end which provides an additional feature which can be used on the show stick.

While the invention has been particularly shown and described with reference to a preferred embodiment, it will be understood by those skilled in the art that various changes in form and detail may be made therein without departing from the spirit and scope of the invention.

What is claimed is:

1. A system for a show stick, said show stick comprising an upstream whip component joined with a downstream whip component by a joint;
a spring overlaying the joint;
a first protective layer atop said spring.

2. The system of claim 1 further comprising a second protective layer atop said first protective layer.

3. The system of claim 2 wherein said second protective layer comprises a plurality of notches along its length.

4. The system of claim 2 wherein said spring comprises a length when coiled around said show stick, and wherein said first protective layer comprises a length, and wherein the length of the first protective layer is greater than the length of the spring, and wherein said second protective layer comprises a length, and wherein the length of the second protective layer is less than the length of the first protective layer.

5. The system of claim 1 wherein said spring extends upstream and downstream beyond said joint.

6. The system of claim 1 wherein said spring comprises at least one spring coil end which is not wound around said upstream end.

7. The system of claim 1 wherein the downstream whip component has an open upstream opening into which the downstream end of the upstream whip component fits to form said joint.

8. The system of claim 1 wherein said spring is at least 2 inches in length when it is coiled around said show stick.

9. The system of claim 1 wherein said spring comprises a length when coiled around said show stick, and wherein said first protective layer comprises a length, and wherein the length of the first protective layer is greater than the length of the spring.

10. The system of claim 1 wherein said first protective layer comprises electrical heat shrink.

11. A method of making a show stick, said method comprising the steps of:
a) obtaining a whip which has an upstream whip portion coupled to a downstream whip portion at a joint;
b) installing a spring around said joint, wherein said spring extends upstream and downstream from said joint;
c) placing a first protective layer around said spring, wherein the first protective layer extends upstream and downstream from said spring.

12. The method of claim 11 further comprising the step of:
d) placing a second protective layer around the first protective layer.

13. The method of claim 11 wherein the spring comprises a plurality of coils, and wherein said installing step comprises wrapping said coils around portions of said upstream whip portion and said downstream whip portion.

14. The method of claim 13 wherein the installation step comprises leaving at least one spring coil end not wound around either said upstream whip portion or said downstream whip portion.

15. The method of claim 11 wherein said placing of step c) comprises shrinking said first protective layer to fit snugly around said spring.

16. The method of claim 12 wherein said placing further comprises placing notches along a length of said second protective layer.

17. The method of claim 12 wherein said first protective layer has a length, wherein said second protective length has a length, and wherein the spring has a length, wherein the first protective layer has a length greater than the spring and greater than the second protective layer.

* * * * *